UNITED STATES PATENT OFFICE 2,112,244

AMINO AZOBENZENE ARSONIC ACIDS

Alfred E. Jurist, Brooklyn, N. Y., assignor to E. R. Squibb & Sons, New York, N. Y., a corporation of New York No Drawing. Application August 26, 1933, Serial No. 687,013

3 Claims. (Cl. 260—14)

This invention relates to, and has for its object the provision of, certain arseno azobenzenes, of therapeutic value, especially in the treatment of parasitic infections.

Compounds of this invention have the probable general formula

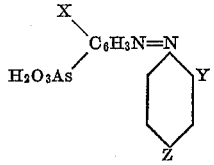

wherein X represents hydrogen or hydroxy, and Y and Z both represent amino or one of them represents amino and the other represents hydroxy; and may be prepared by diazotizing

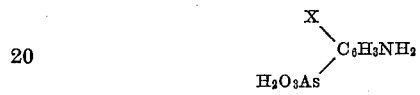

and coupling with

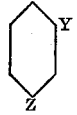

Example 1

A compound having the probable formula

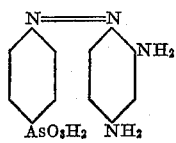

may be prepared as follows:

21.7 g. arsanilic acid is dissolved in 25 cc. concentrated hydrochloric acid diluted with 100 cc. water; diazotization is effected at 0° with 7.5 g. sodium nitrite in 55 cc. water; excess nitrous acid is consumed by adding 0.5 g. urea; after fifteen minutes a solution of 14.5 g. meta-phenylene diamine hydrochloride in 50 cc. water is added at one time, and the mixture is stirred for an hour at 0° and for three hours at 25°; the aqueous phase is poured off and the separated semi-solid substance is dissolved in alkali; the solution is made slightly acid with dilute acetic acid; the dark red precipitate, which is the desired compound, on being filtered off, washed with water, and dried in vacuo, melts at 255–257° and decomposes at 262° and when purified by suspension in alcohol to remove contaminating tar, filtration, washing with alcohol and then with water, and drying in vacuo, is a bright red powder shrinking at 246° and not melting by 295°.

Example 2

A compound having the probable formula

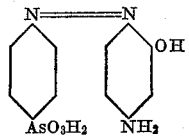

may be prepared as follows:

21.7 g. arsanilic acid is dissolved in 25 cc. concentrated hydrochloric acid diluted with 125 cc. water; diazotization is effected at 0° with 7.5 g. sodium nitrite in 60 cc. water; excess nitrous acid is consumed by adding 1.0 g. urea; after fifteen minutes a solution of 10.9 g. meta-aminophenol in 8 cc. of concentrated hydrochloric acid diluted with 60 cc. water is added at one time at 0°, and the mixture is stirred for an hour at 0° and then allowed to stand one and one-half hours at 25°; dilute sodium hydroxide is added until all the precipitate formed, except a small amount of tarry matter, is dissolved; the mixture is filtered and the filtrate made slightly acid with dilute acetic acid; the bright red precipitate, which is the desired compound, if filtered off, washed with water, sucked dry on filter paper and crystallized from 90% alcohol, yielding small orange-red needle-like crystals softening at 286° and not melting by 295°.

Example 3

A compound having the probable formula

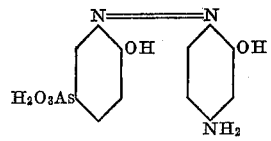

may be prepared as follows:

15.0 g. 3-amino 4-hydroxy benzene arsonic acid is dissolved in 25 cc. concentrated hydrochloric acid diluted with 100 cc. water; diazotization is effected at 0° with 5.0 g. sodium nitrite dissolved in 35 cc. water; excess nitrous acid is consumed by adding 1.0 g. urea; 7.0 g. meta-aminophenol dissolved in 15 cc. concentrated hydrochloric acid and 60 cc. water is added at one time, and the mixture is stirred for an hour at 0° and for two hours at 28°; sodium carbonate is added until the precipitate formed is substantially dissolved; the mixture is filtered and the filtrate acidified with dilute acetic acid; the reddish-brown flocculent precipitate, which is the desired compound, is filtered off, washed with water and sucked dry on the filter, placed in 500 cc. hot 70% alcohol to purify from tarry material, and after filtration, washing with cold alcohol and then with ether, and drying in vacuo, yields a reddish-brown powder shrinking at 270° and not melting by 275°.

I claim:

1. Compounds having the probable general formula

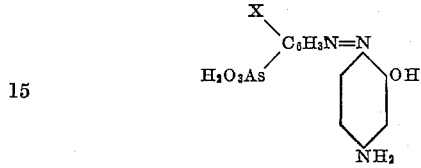

wherein X represents a member of the group consisting of hydrogen and hydroxy, prepared by diazotizing

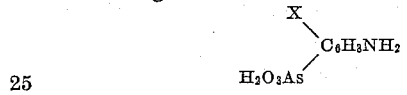

wherein X represents a member of the group consisting of hydrogen and hydroxy, and coupling with meta-aminophenol.

2. A compound having the probable formula

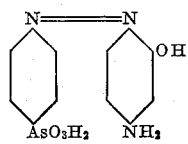

prepared by diazotizing arsanilic acid and coupling with meta-aminophenol.

3. A compound having the probable formula

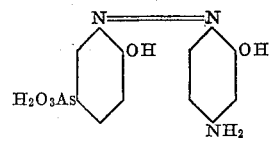

prepared by diazotizing 3-amino 4-hydroxy benzene arsonic acid and coupling with meta-aminophenol.

ALFRED E. JURIST.